United States Patent [19]

Davison

[11] 4,163,905

[45] Aug. 7, 1979

[54] ELECTRIC GENERATING WATER POWER DEVICE

[76] Inventor: Fred E. Davison, Highwood, Mont. 59450

[21] Appl. No.: 905,523

[22] Filed: May 5, 1978

Related U.S. Application Data

[63] Continuation of Ser. No. 609,008, Aug. 29, 1975, abandoned.

[51] Int. Cl.² ............................................. F01D 23/00
[52] U.S. Cl. ........................................ 290/54; 415/5; 416/8
[58] Field of Search ..................... 290/42, 43, 53, 54; 415/5; 416/7, 8, 17, 116

[56] References Cited

U.S. PATENT DOCUMENTS

| | | | |
|---|---|---|---|
| 971,379 | 9/1910 | Hillis | 416/116 |
| 3,730,643 | 5/1973 | Davison | 290/55 |
| 3,927,330 | 12/1975 | Skorupinski | 290/54 |

FOREIGN PATENT DOCUMENTS

| | | | |
|---|---|---|---|
| 742788 | 12/1943 | Fed. Rep. of Germany | 416/17 |
| 862663 | 3/1941 | France | 415/5 |
| 1375241 | 9/1963 | France | 290/54 |
| 403607 | 3/1932 | United Kingdom | 416/8 |

*Primary Examiner*—B. Dobeck
*Attorney, Agent, or Firm*—Berman, Aisenberg & Platt

[57] ABSTRACT

A submerged water power machine in which a plurality of vertical blades are connected to two endless chains, one located at the top ends and the other located at the bottom ends of the blades. The blades drive the chains about two endless horizontal tracks, and the chains are drivingly coupled to electric generators. Each blade is mounted on an individual truck supported on the top track and is guided at its bottom by a roller within the bottom track. The endless tracks are arranged as two spaced-apart parallel runs connected by semi-circular end sections. Each blade is adjustable about vertical pivot means on its truck and is controllable so that the blades can be positioned to drive the machine while moving along both runs of the tracks. The blades are adjusted either by electric servo motor drive means controlled by a position programmer or by followers carried by the blades and engaging cam tracks. The trucks, top chain and blade-positioning control elements are contained in a pressurized inverted cup-hole housing so that these parts operate in air rather than water. Over this housing is a flotation air compartment containing the generators. Tether lines are employed to anchor the machine to the ocean floor. The blades are spaced far enough apart to allow a portion of the water to flow past the first row of blades into the path of the second row of blades, with the blades of both rows oriented to develop driving force on the chains in the same direction of chain travel.

15 Claims, 10 Drawing Figures

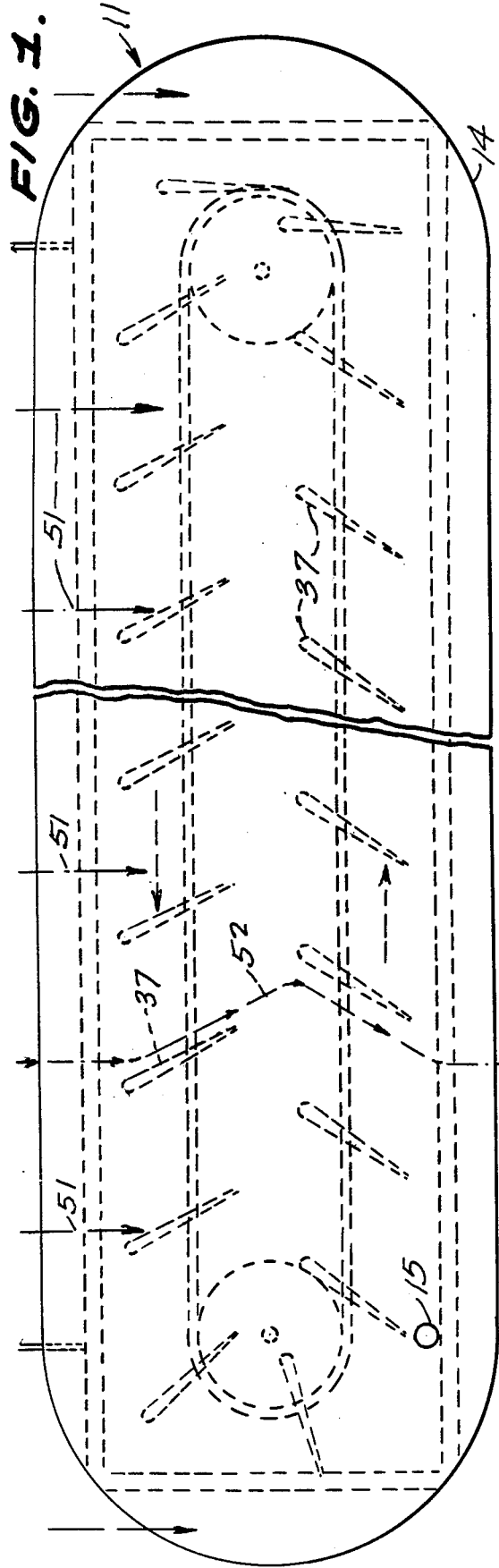
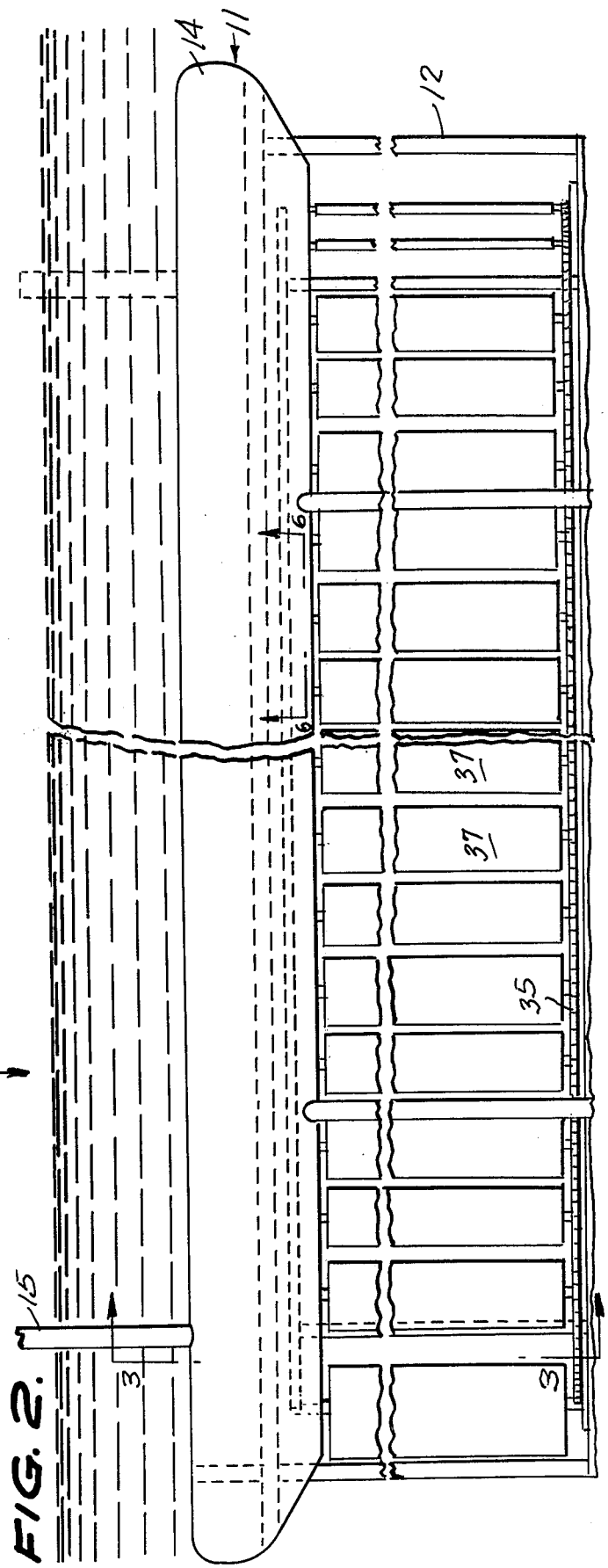

ELECTRIC GENERATING WATER POWER DEVICE

This is a continuation of application Ser. No. 609,008, filed Aug. 29, 1975 now abandoned.

This invention relates to water power energy conversion machines and more particularly to a submerged water power machine of the traveling blade type.

SUMMARY OF THE INVENTION

The present invention includes a plurality of truck-mounted blades supported in a submerged structure, the blades being adjustable about vertical pivots to position the blades for a maximum driving effort. The trucks supporting the blades travel along an endless track contained in a pressurized air chamber, the endless track including relatively long spaced parallel runs connected by short semi-circular runs with the trucks being connected by a chain which drives one or more electric generators. The blades are adjustable to provide the maximum driving effort when moving with or across the driving water currents and with minimum resistance when moving against the currents. In one embodiment of the invention the orientations of the blades are controlled by suitably energized servo motors carried on their supporting trucks, and in another embodiment of the invention the orientations of the blades are controlled by follower elements carried by the trucks and operatively engaged with cam tracks.

A main object of the invention is to provide a novel and improved water power conversion machine which is of relatively simple construction, which has relatively uncomplicated parts which are easy to maintain in operation, and which is capable of generating very substantial amounts of electrical energy without pollution.

A further object of the invention is to provide an improved submerged water power conversion machine which is capable of generating large amounts of electric power from relatively low velocity flows of liquid, which is arranged in a substantially submerged condition to protect the machine from waves, storms, rough weather conditions or passing ships.

A still further object of the invention is to provide an improved submerged water power conversion device adapted to be installed in regions where there are substantially continuous and heavy movements of water, such as ocean currents, and the like, and which can be relatively easily installed, which is reliable in operation, which is provided with a pressurized compartment containing the most important moving parts thereof and which has access means to enable personnel to enter the compartment for servicing of the parts, as required, and which is tethered to the ocean floor or other stationary means adjacent to the machine so that it is anchored in working position.

A still further object of the invention is to provide an improved submerged water power conversion machine of the type employing moving blades propelled by water currents or the like, the blades presenting a relatively large effective working area and being arranged in two parallel rows moving in an endless path with means to suitably adjust the blades so that both rows of blades are properly oriented to utilize the moving water currents for driving the blades and for generating electric power as a result of the blade movements around the endless path in which the blades are guided.

A still further object of the invention is to provide an improved submerged water power machine using a series of blades arranged in parallel configuration which are exposed to the action of moving water current and which provide a cascade effect which is highly effective to transfer energy from the moving water to electrical generator means.

A still further object of the invention is to provide an improved submerged water power machine employing rows of blades arranged in an endless path configuration for converting water current energy into movements of the blades, the blades being supported at their tops and bottoms for holding them in stable working positions and the blades providing a very large working area exposed to the moving water currents so that the machine has relatively high capacity and is of reasonably confined bulk, as well as being relatively inexpensive to maintain in operating condition and requiring a minimum amount of human supervision.

Further objects and advantages of the invention will become apparent from the following description and claims, and from the accompanying drawings, wherein:

FIG. 1 is a top plan view of an improved water power machine constructed in accordance with the present invention.

FIG. 2 is a side elevational view of the water power machine of FIG. 1.

DESCRIPTION OF THE PREFERRED EMBODIMENTS

Figure 3:
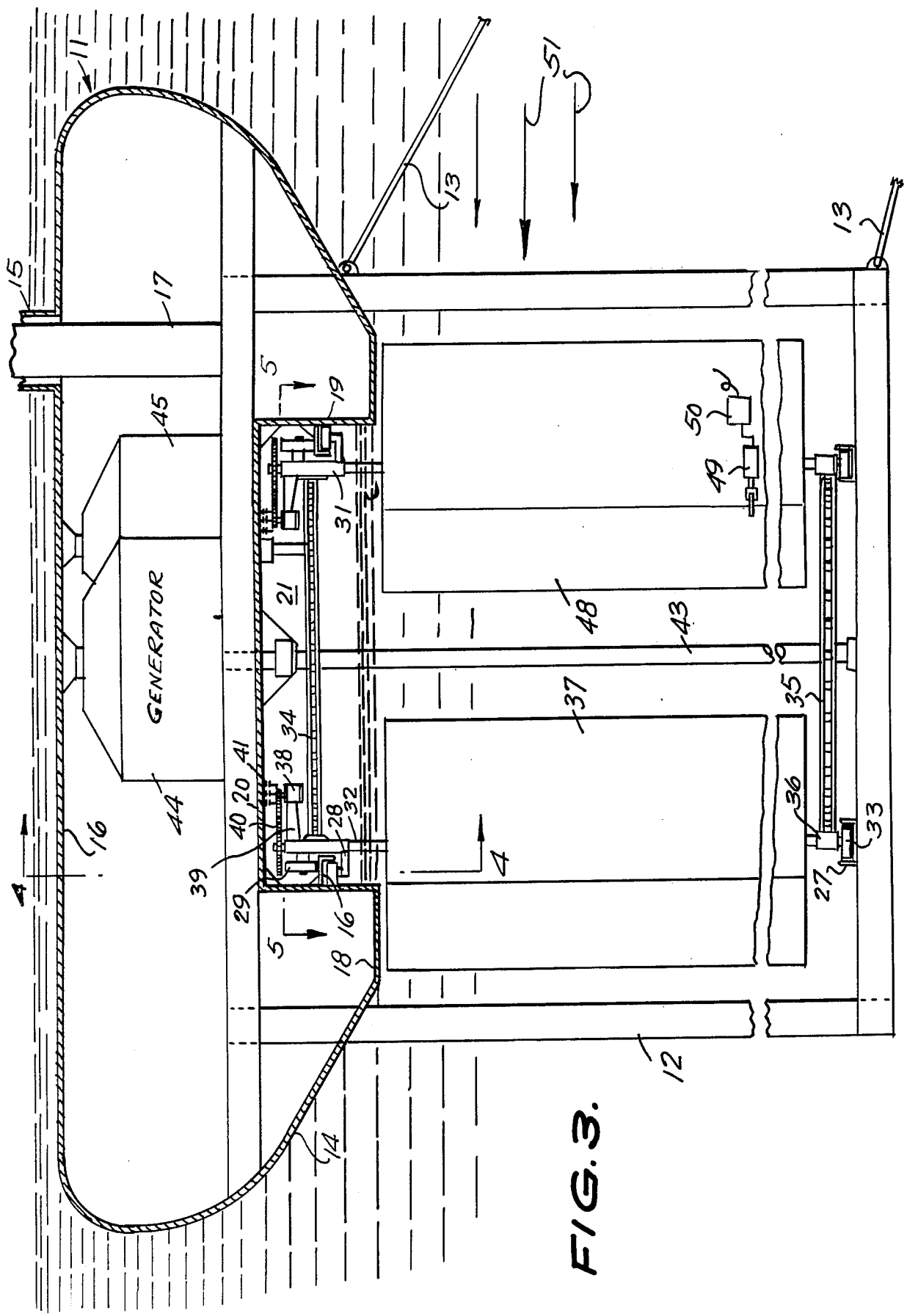
FIG. 3 is an enlarged transverse vertical cross-sectional view taken substantially on the line 3—3 of FIG. 2.
Figure 4:
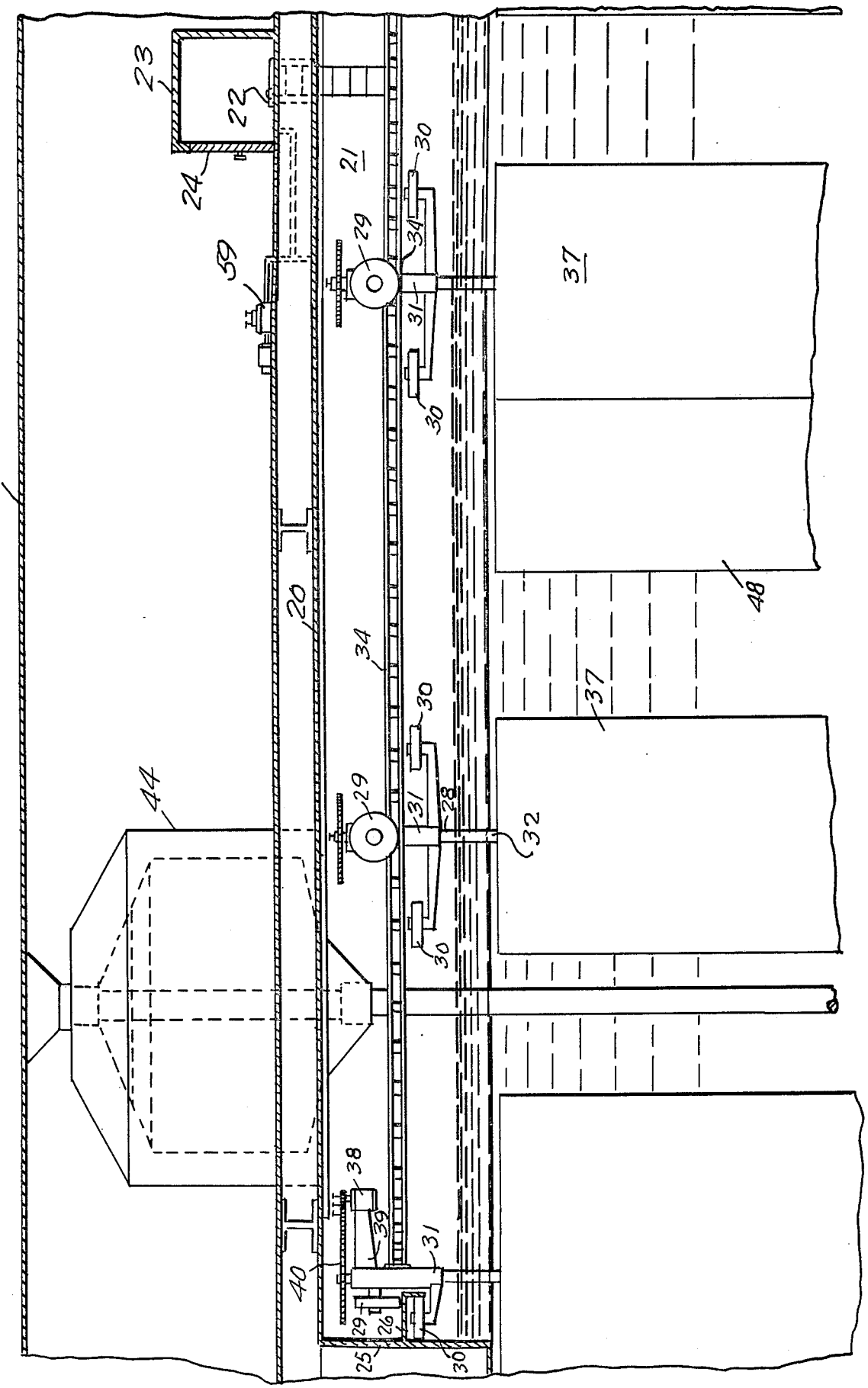
FIG. 4 is a fragmentary longitudinal vertical cross-sectional view taken substantially on the line 4—4 of FIG. 3.
Figure 5:
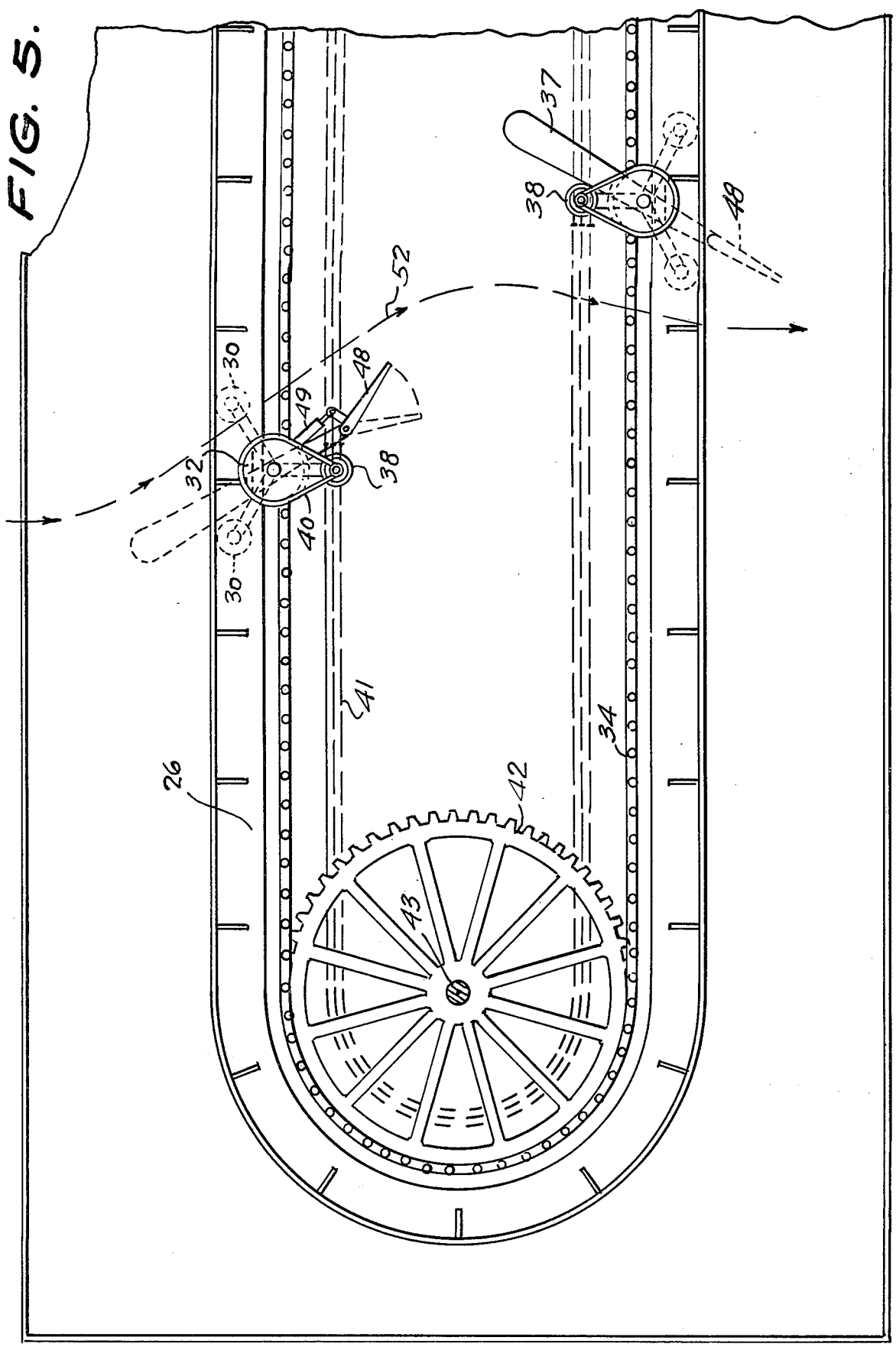
FIG. 5 is a fragmentary horizontal cross-sectional view taken substantially on the line 5—5 of FIG. 3.

Referring now to the drawings in detail wherein like reference characters indicate like parts throughout the several figures, and more particularly referring to FIGS. 1 to 7, the reference numeral 11 indicates generally a water power machine constructed in accordance with the present invention.

The water power machine 11 includes a generally horizontal elongated frame 12 submerged in the water in an area containing established currents or flow of substantial magnitude, in the ocean, in a river, or in any other body of water known to have such currents or flow. The frame is provided with tether lines 13 connected to suitable anchoring means engaged with or embedded in the bottom, so as to retain the frame in a substantially fixed location and orientation, exposed to the water currents. Seated on the top portion of frame 12 is a horizontally elongated flotation chamber 14 having an upwardly vertically extending access shaft 15 connected to its top wall 16, said access shaft 15 extending above the water surface to form an air vent and containing a suitable elevator assembly 17, or other suitable access means to enable personnel to enter and leave the flotation chamber 14. The bottom wall 18 of chamber 14 is formed with a longitudinally extending inverted cup-like portion 19 having a top wall 20. An electrically driven air pump 59 in the flotation chamber 14 is connected to the internal cavity 21 defined by inverted cup-like portion 19 to pressurize same and to thereby form a compression chamber comprising the major portion of the volume of said cup-like portion. Flotation chamber 14 is connected to said compression chamber by a hatch 22 (see FIG. 4) contained in a decompression compartment 23 provided with a sealing door 24 to enable the personnel to safely enter and leave compression chamber 21 at times in order to inspect the contents of the compression chamber or to service said contents, as required.

Mounted on the peripheral side wall 25 of the compression chamber 21 and extending therearound is an endless rail 26 forming a downwardly facing continuous channel track extending lengthwise over frame 12. Secured on the bottom portion of frame 12 parallel to endless rail 26 is a second endless rail 27 (see FIG. 3) forming an upwardly facing continuous channel track. Each of the endless rails includes a pair of relatively long spaced apart runs connected at their opposite ends by relatively short semi-circular runs.

A plurality of trucks 28 are movably mounted on and are supported by the top endless rail 26, having top rollers 29 engaging on top of rail 26 and each having spaced guiding rollers 30,30 engaging inside the rail. Each truck has a vertical sleeve portion 31 in which is journaled a vertical blade shaft 32 which extends downwardly through frame 12 and which is provided at its bottom end with a guide roller 33 engaging in the bottom endless rail 27. A first endless sprocket chain 34 is connected to the top sleeve 31, thus connecting the spaced trucks 28. A second endless chain 35 is connected to sleeves 36 journaled on the lower portions of shafts 32 immediately above the rollers 33. Secured on the shafts 32 and extending for the major portion of the height of frame 12 between the plane of the flotation chamber bottom wall 18 and lower chain 35 are respective hollow blades 37 of substantial horizontal width.

Means are provided for individually rotating the blade shafts 32, said means comprising respectively servo motors 38 mounted on arm 39 provided on trucks 28 and gearingly coupled to shafts 32 by sprocket chain assemblies 40. The motors 38 are energized from segmented supply rails 41 engaged by brushes carried by the motors, the segments of the supply rails being furnished with suitably programmed energization signals to properly orient the water current force-receiving blades 37 for most effective thrust as they more around the endless path defined by the top and bottom endless rails 26 and 27.

Figure 6:
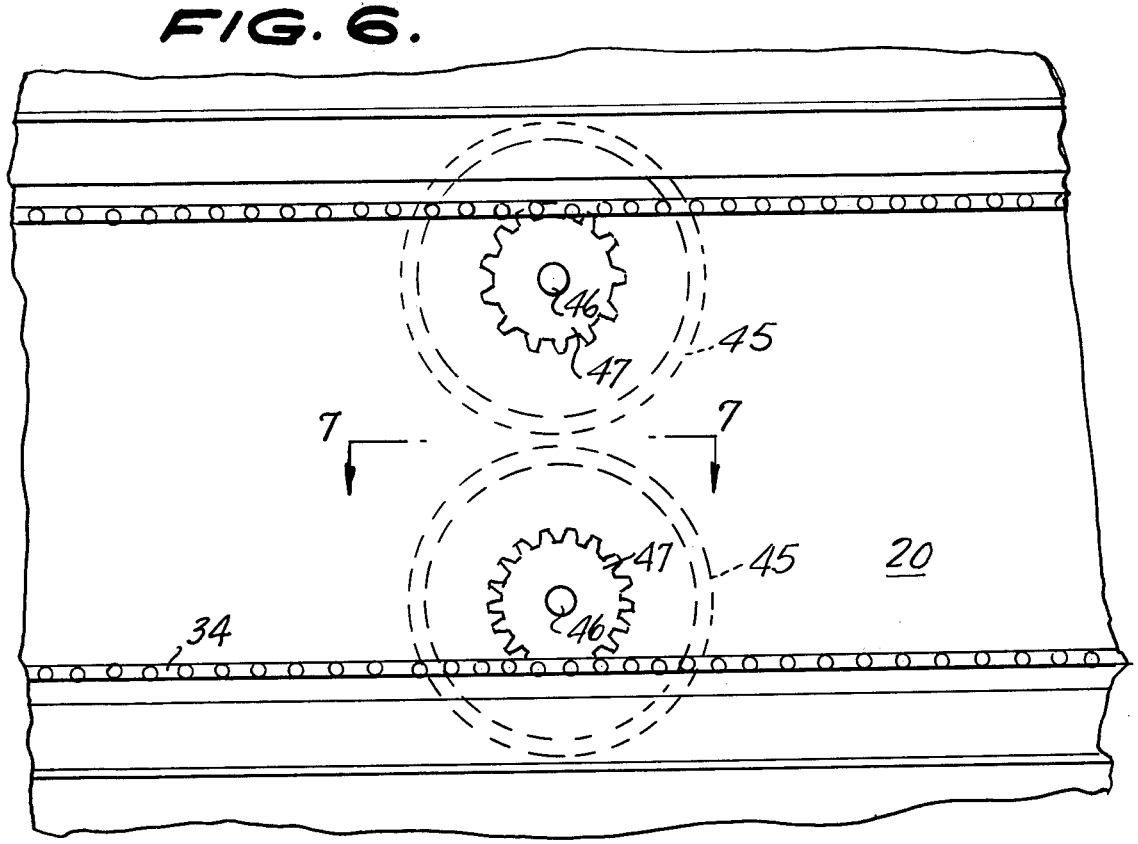
FIG. 6 is an enlarged fragmentary horizontal cross-sectional view taken substantially on the line 6—6 of FIG. 2.
Figure 7:
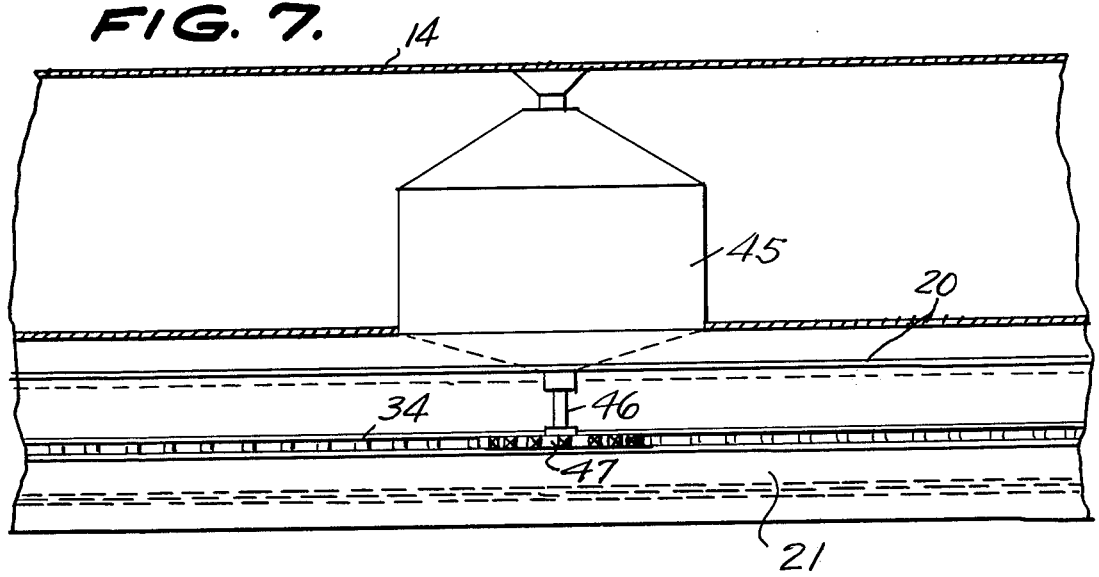
FIG. 7 is a cross-sectional view taken substantially on the line 7—7 of FIG. 6.

The endless chains 34, 35 engage around sprocket wheels 42 mounted on opposite vertical end shafts 43 journaled in frame 12. Shafts 43 are drivingly connected to electric generators 44 mounted in flotation chamber 14. Additional electric generators 45 (see FIGS. 6 and 7) in chamber 14 may be drivingly coupled to intermediate portions of top endless chain 34 by vertical shaft portions 46 provided with sprocket wheels 47 meshingly engaged with chain 34, as shown in FIGS. 6 and 7.

The blades 37 are provided with auxiliary vertically pivoted flaps 48 which are controlled by hydraulic cylinders 49 mounted on the blades (see FIG. 3) each cylinder being operated by an electrically driven hydraulic pump 50 controlled from the flotation chamber 14. Thus, individual fine adjustments of the effective thrust areas of the blades can be made in accordance with temporary variations in the directions of the water currents or other similar temporary external physical changes occurring from time to time.

As above mentioned, the blades 37 are preferably hollow to minimize their weights and to minimize their inertia effects.

In operation, assuming normal water current flow to be in the direction indicated by the arrows 51, namely, transverse to the longitudinal axis of the machine, the blades at the front side of the machine are oriented to develop leftward thrust reaction, as viewed in FIG. 1, and to drive the front runs of the chains leftward. As the blades pass around the left ends of the rail assemblies (in a counterclockwise direction as viewed in FIG. 1) they are reoriented by their servo motors to positions wherein the water currents reaching the rear run of the machine can act on the blades to develop rightward thrust reactions to continue to move the chains in the same sense, namely, to continue the counterclockwise movement of the chains, as viewed in FIG. 1, and to maintain continuous driving torque on the shafts of the electric generators. As the blades pass around the right ends of the rail assemblies (still moving in a counterclockwise direction) they are reoriented by their servo motors so as to return to their original orientation as they reach the front side of the machine. As shown at 52, the water moving through the blades is guided by the blades so as to pass smoothly through them without excessive turbulence and with effective thrust on the inclined blades.

Figure 8:
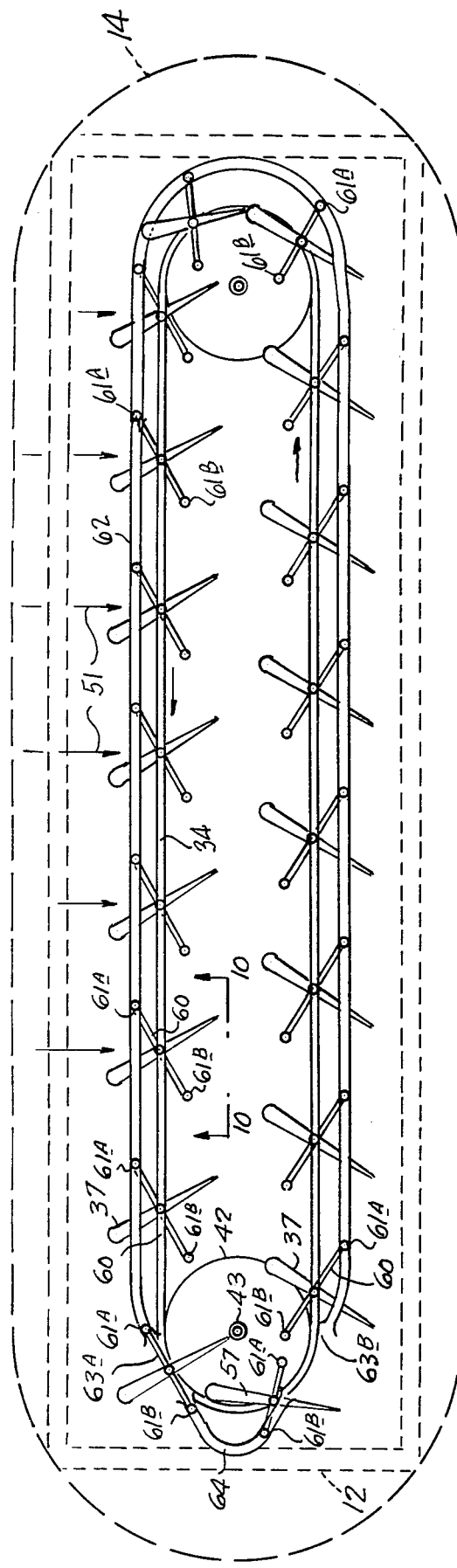
FIG. 8 is a schematic top plan view of a modified form of water power machine employing a cam-and-follower blade positioning system instead of an electrical servo-operated blade-positioning system, in accordance with the present invention.
Figure 10:
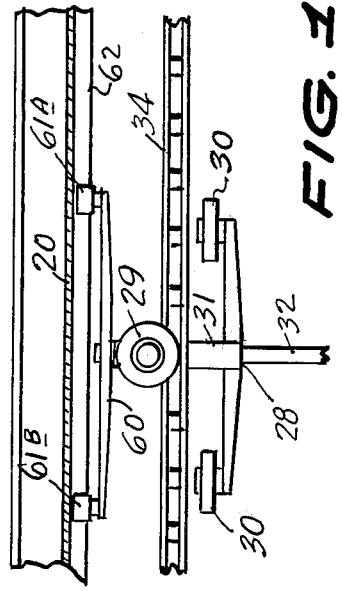
FIG. 10 is a fragmentary enlarged elevational view taken substantially on the line 10—10 of FIG. 8, showing the structure of FIG. 9 in elevation.
Figure 9:
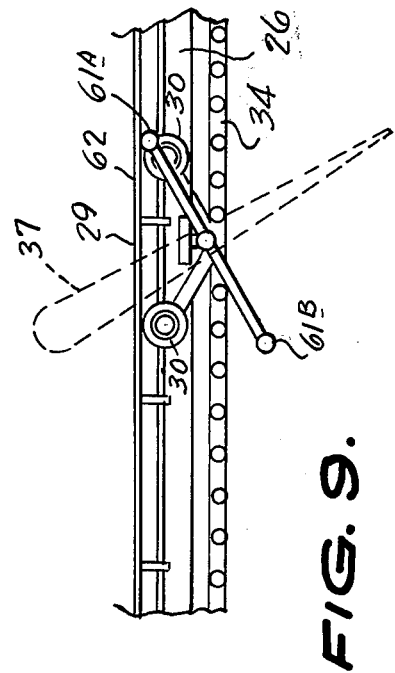
FIG. 9 is an enlarged fragmentary horizontal plan view of a portion of the cam-and-follower operated system of FIG. 8, including the manner in which one end roller of a blade-associated cam arm engages with the blade-controlling cam track.

Referring now to the embodiment illustrated in FIGS. 8 to 10, the blade shafts 32 are controlled mechanically instead of by servo motors. Centrally secured to the top end of each blade shaft 32 is an arm 60 provided at its opposite end with respective follower rollers 61A and 61B. Secured to the underside of horizontal wall 20 is a downwardly facing channeled cam track 62 which forms a loop extending in the same direction as the chain 34 and which for the most part is spaced outwardly from chain 34, located, as illustrated in FIG. 8 and as will be further presently described, to selectively receive the rollers 61A and 61B. As shown in FIG. 8, the cam track is interrupted at its left end at the front side thereof, as shown at 63A, to allow a roller 61A to disengage from the cam track as the associated blade reaches the left end of the assembly. The gap in the cam track is sufficient to cause the opposite roller 61B to engage in a small substantially U-shaped cam track end segment 64 as the blade continues leftward movement. Segment 64 is shaped so as to rotate the blade to its new orientation as it passes around the left end of the assembly. Another gap 63B is provided in the cam track to allow roller 61B to disengage from track segment 64, which is shaped so as to position roller 61A for reentry into the rear run of the cam track as the associated blade 37 begins its rightward movement, with the blade held thereafter in its proper rear-run orientation, as shown in FIG. 8. At its right end, the cam track is suitably shaped to guide the blades back to their original front-side orientations as said blades travel around the right end of the assembly and begin their leftward movement.

Thus, the mechanical blade control system shown in FIGS. 8 to 10 performs substantially the same function as the servo motor-operated system employed in the embodiment of FIGS. 1 to 7, and the operation of the embodiment of FIGS. 8 to 10 is substantially the same as previously described in connection with FIGS. 1 to 7.

While certain specific embodiments of an improved submerged water power machine have been disclosed in the foregoing description, it will be understood that various modifications within the spirit of the invention may occur to those skilled in the art. Therefore, it is intended that no limitations be placed on the invention except those defined by the scope of the appended claims.

What is claimed is:

1. A water power machine comprising a generally horizontally elongated frame submerged in the water, means to anchor the frame in a substantially fixed position, a flotation chamber secured on the top portion of the frame and having an inverted cup-like bottom wall portion, air pump means connected to said cup-like bottom portion to pressurize same and form an air compression chamber, respective parallel top and bottom endless rails secured respectively lengthwise in said compression chamber and to the bottom portion of said frame, each of said rails including a pair of relatively long spaced apart runs connected at their opposite ends by relatively short semi-circular runs, a plurality of trucks mounted on the top endless rail at spaced apart intervals for movement therealong, a first flexible endless chain connecting said trucks, electric generator means coupled to said first endless chain, vertical shafts journaled to said trucks and having bottom guide means engaging the bottom endless rail, sleeve means journaled on the lower ends of the shafts, a second endless chain connecting said sleeve means, respective blades mounted on said shafts between the endless chains, and means for rotating said blades around the axes of the shafts to desired positions relative to water currents in accordance with the positions of the blades along the endless rails.

2. The water power machine of claim 1, and wherein the means for rotating each of the blades includes an electric servo motor on the associated truck which rotationally adjusts the position of the associated blade.

3. The water power machine of claim 2, and wherein said compression chamber is provided with segmented power supply contact means extending along the endless top rail and the servo motors are provided with brush means engaging said contact means for energizing the motors.

4. The water power machine of claim 1, and wherein the blades are provided with pivoted auxiliary blade segments and with electrically controlled means for pivotally adjusting the auxiliary segments relative to the blades.

5. The water power machine of claim 1, and wherein said electric generator means comprises at least one electrical generator mounted in said flotation chamber and having drive means meshingly engaged with said first endless chain.

6. The water power machine of claim 1, and wherein said flotation chamber is provided with a vertically upwardly extending vented access passage leading to the water surface.

7. The water power machine of claim 1, and wherein the means for rotating the blades comprises interengaging cam and follower means on the cup-like bottom wall portion and the shafts for pivotally adjusting the blades in accordance with their positions along the endless rails.

8. The water power machine of claim 7, and wherein the cam and follower means comprises follower arms secured to the top ends of the shafts and cam track means on the cup-like bottom wall portions extending along the top endless rail and being engaged by the follower arms.

9. The water power machine of claim 8, and wherein the cam track means includes means cooperating with the follower arms to rotate the blades to changed thrust-generating angles at the semi-circular runs of the endless rails.

10. The water power machine of claim 9, and wherein the follower arms each has follower rollers at its opposite ends and the cam track means has open portions adjacent one of said semi-circular runs located to cause disengagement of one follower roller from the cam track means and engagement of the other roller with the cam track means as the associated blade moves around said one semi-circular run.

11. A water power machine comprising a generally horizontally elongated frame, means anchoring said frame submerged in water, a submerged flotation chamber secured on the top portion of the frame and having an inverted cup-like bottom wall portion, air pump means connected to said cup-like bottom portion to pressurize same and form an air compression chamber, an endless rail secured lengthwise in said compression chamber, said rail including a pair of relatively long spaced apart runs connected at their opposite ends by relatively short arcuate runs, a plurality of trucks mounted on the said endless rail at spaced apart intervals for movement therealong, flexible endless chain connecting said trucks, electric generator means in said flotation chamber and coupled to said endless chain, vertical shafts depending from said trucks into said water below the compression chamber, and respective blades mounted on said shafts.

12. The water power machine of claim 11 wherein said shafts are journaled to said trucks and means are provided for rotating said blades around the axes of the shafts to desired positions relative to water currents in accordance with the positions of the blades along the endless rail.

13. A water power machine, which comprises: a submerged frame member; a submerged flotation chamber connected to said frame member; a plurality of submerged blade means for moving in response to water current flow; machine element means positioned under said flotation chamber for supporting said blade means and for guiding same along a predetermined path; means operatively connected to said machine element means for generating electrical power in response to the movement of said blade means; and means for keeping said machine element means dry which comprises an inverted cup-like chamber which surrounds the top and sides of said machine element means but is open at the lower portion thereof and is formed in the bottom wall of said submerged flotation chamber, and means for supplying air to said inverted cup-like chamber for maintaining the water level below said machine element means positioned therein.

14. A water power machine as set forth in claim 13, further comprising decompression compartment means for selectively providing access between said submerged flotation chamber and said inverted cup-like chamber.

15. A water power machine as set forth in claim 13, further comprising servo motor means positioned within said inverted cup-like chamber for rotating said blade means in accordance with their position on said machine element means for guiding same.

* * * * *